United States Patent

[11] 3,593,959

| [72] | Inventor | Bobby Howard Greene |
| | | Rte. 2, Malvern, Pa. 19355 |
| [21] | Appl. No. | 852,527 |
| [22] | Filed | July 23, 1969 |
| [45] | Patented | July 20, 1971 |

[54] POCKET UNLOADER VALVE OPERATOR
1 Claim, 1 Drawing Fig.

[52] U.S. Cl. .................................................. 251/63.6,
91/196, 92/117, 92/59
[51] Int. Cl. .............................................. F16k 31/143
[50] Field of Search ........................................... 251/63.6,
63.5, 128, 62; 91/196, 217; 92/117, 59;

[56] References Cited
UNITED STATES PATENTS
1,995,561  3/1935  Belanger et al. ................ 251/63.6 X 2,696,361  12/1954  Jensen ............................ 251/63.6
3,290,003  12/1966  Kesszer .......................... 251/63.6 X
3,110,471  11/1963  Kuhles ........................... 251/62 X Primary Examiner—Arnold Rosenthal
Attorney—Rollin D'Arcy Morse ABSTRACT: A simplified, compact, inexpensive, add-on pneumatic operator with cylinder and piston for pneumatically opening and closing pocket unloading valves on reciprocating gas compressors. Provision is made for utilizing existing stems, packing, and valves of hand-operated units, existing attachment bolt locations. Simplified self-alignment is built in, and provision included for venting any compressed gas and/or operating air leakage.

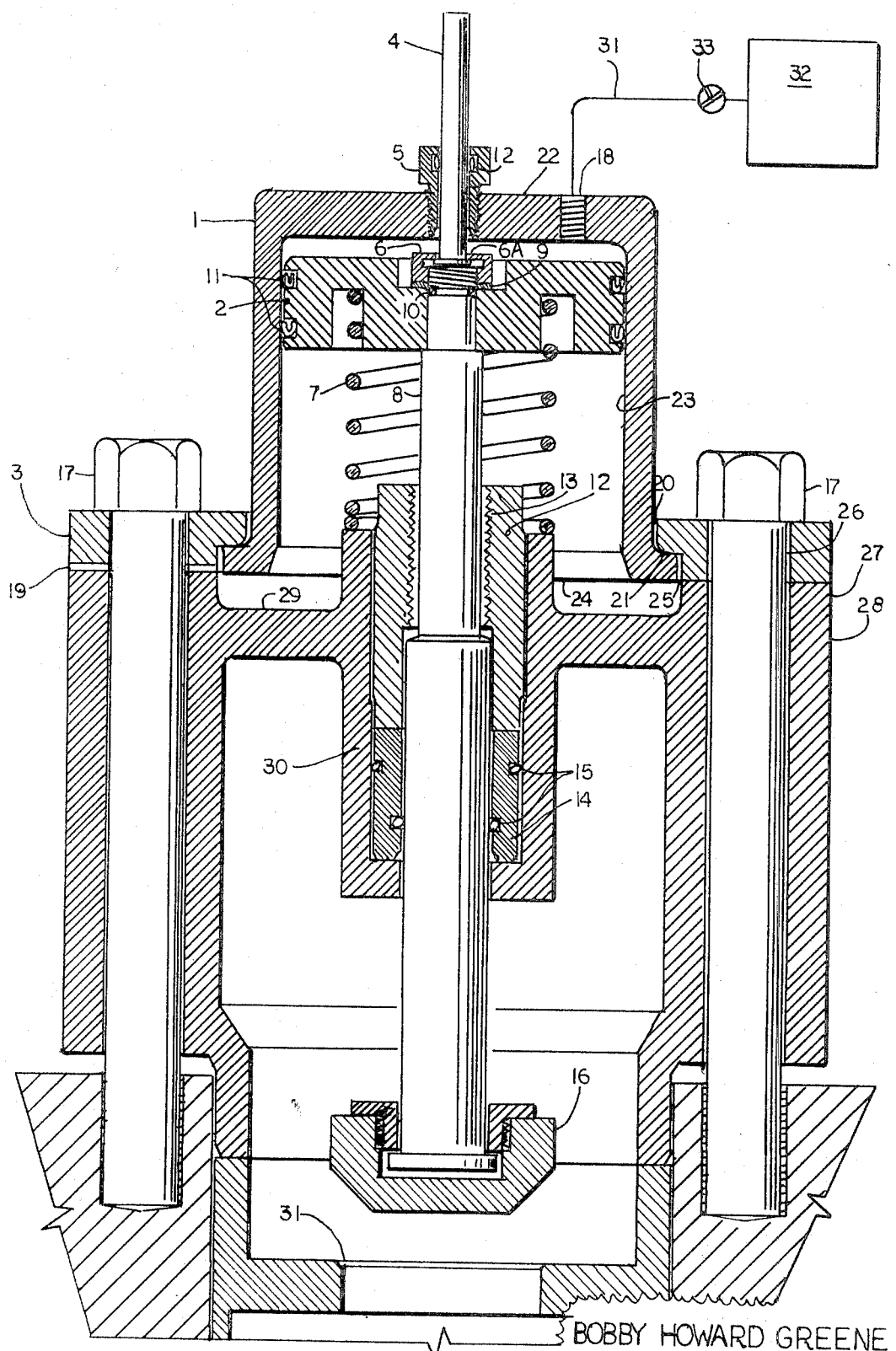

POCKET UNLOADER VALVE OPERATOR

INTRODUCTON

In the general field of compressing large volumes of gases, for many years ordinary air was the only gas commonly so treated. In the last 50 years, however, it has become ever more common to transport large volumes of natural gas over distances of thousands of miles from the gas wells and oil refineries to the cities and industries for consumption. It has been found most economical to compress the natural gas to several hundred pounds per square inch, 800 p.s.i.g. being a typical figure. As the result of friction in the pipeline, the pressure gradually decreases, and it is necessary every few hundred miles to recompress the gas to its desired transport pressure. Typically again, the gas is recompressed when its pressure has fallen by about 200 p.s.i. For this purpose, on a large pipeline 10 large compressors, each of 4 or 5 compression cylinders may be needed simultaneously at each booster station when the demand for gas is high. However, as demand fluctuates from hour to hour, it will be necessary to alter the loading of some of the compressors. Commonly, the loading is altered by opening of one or more valves on each compressor cylinder, each valve connecting the cylinder clearance space with an individual chamber, called a "pocket" in the art, so that some of the gas being compressed is not expelled from the cylinder but is simply compressed into the increased clearance space provided by the chamber and allowed to reexpand as the piston recedes after the end of its stroke. The opening and closing of the pocket unloader valves occurs at irregular times, yet is a necessary, and even frequent procedure in balancing out compressor loading to match fluctuating demand, and requires considerable operator attention.

Although power operated unloader valves for gas compressors were invented by at least as early as 1912 (U.S. Pat. No. 1,027,757 to Prellwitz), and although several manufacturers of compressors offer powered unloading valves as accessories for their compressors, yet up to the present time these operators have produced enough problems that many large compressors have been equipped with hand-operated valves.

Difficulties with the powered unloading valves have included (1) high costs (2) high maintenance time and costs, requiring many hours of shutdown of the compressor, which is itself a great expense in lost operating time; (3) high labor cost for maintenance, (4) large space requirement, making other maintenance more difficult, and in certain instances preventing use of powered operators on adjacent sides of neighboring compressor cylinders. Many of the available commercial automatic pocket valves use a portion of the compressed gas as motive power; as the valve is switched from its pressured to its unpressured position, the gas within its cylinder must be expanded to a lower pressure and disposed of. If a sufficiently low-pressure disposal reservoir is not available, facilities must be provided for safely venting the gas. With natural gas, these facilities must include not only the collecting pipelines but also some kind of safe and automatic flare device. And it is obvious that in this situation the fuel value of the natural gas is a total loss, and is a significant expense, as well as a source of thermal pollution.

There are on the market some pneumatic relays, so designed that compressed air may be used to actuate the relay—in one form, a type of slide valve. The relay in turn switches high-pressure gas into the operator cylinder, or vents this gas as above. This approach minimizes the amount of holdup of combustible gas in small diameter instrument piping interconnecting the relay with central panel boards; consequently, the number of places of possible leakage of combustible gas is reduced, and the hazards of explosion thereby also reduced. However, the pneumatic relays are in themselves very expensive, and their installation directly on the pocket valves increases the bulk of each valve.

On the other hand, difficulties with the hand-operated valves have included (1) large labor force required because of extended time and significant manual effort required for hand operation; (2) difficulty of quickly changing loading to meet rapidly fluctuating demands; (3) inability to know at a central control point what valves on each compressor are open or closed, except by sight, (4) inability to control remotely and automatically.

OBJECTS OF THE INVENTION

The present invention is an outgrowth of many years of practical experience in the natural gas industry. It answers all the difficulties of the past pocket unloader valves, and has for specific objects, the following:

1. Reduction in original cost of unloader valves.
2. Reduction in maintenance time.
3. Increase in operating time between maintenance needs.
4. Reduction in labor both for operation and for maintenance. 5. Highly satisfactory insertion in air-operated (pneumatic) central control systems.
6. Ready, simple, low-cost application to take the place of manual pocket valves.
7. Avoidance of danger from intermixed air and compressed gas.
8. Compact installation, avoiding mutual interference between adjacent operators, and thereby permitting more operators and finer gradation in steps of unloading a compressor.

Experience in large scale trials over a period of several months has thoroughly demonstrated that all of the above objects, and others, are fully met.

PRIOR ART

It is not surprising that most of the prior art dealt with pocket unloading valves for air compressors, for this was the earliest large scale need. In this use are found many examples of unloading valves actuated by pistons moving in cylinders, under the impulse of the fluid being compressed, namely air. An early example is shown in FIG. 1 of U.S. Pat. No. 1,430,578 to W. W. Metzgar, 10/3/1922, where valve 1 is biassed away from its seat by spring U, and toward its seat by compressed air applied to piston V. Although little detail of this valve can be determined from the disclosure, it appears that no particular provision was needed or made for preventing intermixing of valve-operating gas with the compressed gas; it also appears that the entire operator and the valve are designed as a unitary device not intended as an add-on for application instead of hand-operated valves.

In 1926 Longacre secured U.S. Pat. No. 1,594,986, in which he disclosed a pneumatic piston operator for unloading an air compressor. In this operator, a spiral spring biases the pocket valve in one direction, and a piston slidable in a cylinder bears upon the end of the valve stem and under the influence of air pressure biases the valve in the opposite direction. The piston as illustrated is slidable in its cylinder but is not supported except by its own periphery; accordingly, the piston must be relatively elongate, in order that it will not tend to "cock" in its cylinder, and thereby jam and lose its functional ability; as shown in the FIGURE of the patent the diameter of the piston is nearly equal to its length. There is no disclosure of piston ring packing, of valve stem packing, or of alignment system, if any, for insuring the concentricity and coaxiality of the operator and valve.

In U.S. Pat. No. 2,170,846 to Bach in 1939 disclosed a piston-operated unloader valve, having a spiral spring to open the valve and a chamber for pressure fluid to close the valve by pressure upon the piston. No means is disclosed for preventing leakage through the stem guide hole. The piston as shown is nearly as long as its diameter. No means is provided for correcting for axial misalignment, so all parts must be precision made for proper interfitting. The entire operator was intended for actuation by the fluid being compressed, and no provision is made for avoiding mixing of operating fluid with fluid compressed.

In 1941 Gehres was granted U.S. Pat. No. 2,241,195 for a compressor-unloading mechanism that includes a piston-operated valve, but the disclosure appears to be defective in that an elongated piston is provided, occupying virtually the entire length of the cylinder, and therefore having no room in which to slide. The piston's length is presumably due to the fact that it is not stem mounted, but is self supporting, and accordingly must be relatively long in order not to cock and jam. However, the disclosure is of little guidance because of its inoperativeness.

In U.S. Pat. No. 2,241,330 issued in 1941 to Shaw discloses a piston-operated unloading valve, in which the piston is stem mounted. However, the cylinder in which the piston slides is shown as one piece with the stem guide and the valve guide, and precision machining of the entire unit with three different diameters on two ends would be required in order to effect proper concentricity.

FIGURE

SUMMARY STATEMENT OF THE INVENTION

In a compact, low-profile pneumatic operator adapted for addition to reciprocating gas compressors for the purpose of moving a valve and valve stem along the common axis of the valve and stem between a first position in which the valve is unseated allowing an increase in clearance of the compressor piston in its minimum clearance position, and a second position in which the valve is closed, reducing the compressor clearance, in which compressors the valve stem protrudes through a packing gland from a surface of the compressor, the combination comprising 1. a shallow casing forming a cylindrical chamber closed at one end except for a pipe tap, and open at its other end, 2. clamping means holding the open end of said casing adjacent said surface, and with the axis of said cylindrical chamber generally coaxial with said valve stem, said clamping means being adapted to provide a small degree of play in the lateral position of the axis of the cylindrical chamber, whereby coaxial alignment of the axes of casing and valve spindle is readily obtainable, 3. a piston carried on the protruding end of said valve stem, and arranged and fitted within the cylindrical chamber for sealing engagement with the cylindrical chamber for sealing engagement with the cylindrical wall, the piston having an axial thickness less than about one-half its diameter, whereby the piston is movable axially within said chamber between a position corresponding to the opening of said valve and a position corresponding to its closing, 4. a source of controllable pneumatic pressure connected to the said pipe tap whereby the piston may be pneumatically biassed in axial direction increasing the chamber volume, 5. a spiral spring surrounding said stem and interposed between the compressor surface and the piston whereby the piston is biassed in an axial direction reducing the chamber volume, 6. a vent from the space of the chamber between the piston and compressor surface, whereby any leaks of compressed gas through the said packing gland and of pneumatic pressure air past said piston are vented to a safe disposal.

More specifically, this invention comprises a valve operator assembly of slidable piston in casing including in cooperative combination, 1. a compact casing forming a cylindrical chamber of minimum depth equal to piston throw plus piston thickness, the casing having a closed end and a pneumatic connection, the open end being surrounded by a narrow flange, 2. clamping means comprising a loose circumferential ring surrounding said casing and bearing against its flange behind the open end, and 2a. attachment means holding said ring against the surface of the compressor in spaced relationship to said surface, whereby the casing is loose for self-alignment around the piston, and for venting of leakage of compressed gas and of pneumatic supply from the chamber between said piston and said surface.

3. the piston being mounted on the stem of the valve for axial movement with the valve, the piston having a maximum axial thickness less than half its diameter, and being sealingly slidable in said cylindrical chamber, 4. a source of valved compressed air connected to the pneumatic connection for the purpose of producing and releasing of a force on said piston tending to move the valve stem into said compressor surface, and 5. a spiral spring interposed between the piston and the surface, tending to move the piston, stem, and valve toward the chamber closed end.

FIGURE

The single FIGURE shows a cross section of the pocket unloader valve operator of the present invention, in association with a typical pocket, and pocket valve stem.

DETAILED DESCRIPTION

In the FIGURE is shown a cylindrical casing 1 having a closed end 22 and an open end 24.

The casing at its open end is provided with a flange 21 upon which bears a clamping means 3, this means being in this instance a ring with an inside diameter sufficiently larger than the outside diameter of the casing 1 to surround the casing loosely with clearance shown at 20 and 25, yet bear against the back of the flange. In this instance the ring 3 is provided with holes 26 aligned to permit the passage of bolts 17. Bolts 17 are elongated replacements for the normal bolts which would hold the compressor pocket body 28 in its position on the compressor. The upper surface 29 of the compressor pocket 28 is designated the compressor surface for this invention; in this instance the surface is extended upwards forming spacer shoulders 27 against which the clamping ring 3 is firmly held by the elongated bolts. In other cases the raised shoulders 27 may be eliminated, and physically separate spacers put in their place, or separate spacers in addition to the raised shoulders may be used. The principal function of the spacers is to provide for adaptation of standardized casings to compressor surfaces of various designs. The function of venting from the open end of the casing interior may be provided by the spacers. If the venting is not so provided, it must in some other way be provided, as, for example, by a radial slot 19 in the bottom face of the clamping ring 3.

In the top compressor surface 29 is a packing gland 30 containing a packing nut 12 through which extends a valve stem 8 to the bottom end of which is attached a valve 16 in conventional manner, the valve seating 31 to close off the clearance pocket 28 from the main compressor clearance. Below the packing nut 12 are packing rings 14 and 15 of conventional design.

Shown in the packing nut 12 are threads 13, these being the female threads with which the male threads of a former rising stem manual valve were mated. The stem 8 does not have these male threads and therefore may slide axially through the packing gland to open and close the valve 16. Of course, such threads 13 are no longer operative and may be removed, or the nut replaced with one having no threads.

For existing compressors to which the operator of this invention is being added on, the stem 8 may be inexpensively provided by removing the old valve stem and remachining it to remove its male threads. At the same time, its manual handle end can be cut off, shouldered and threaded for the mounting of the piston 2.

Axial movement of the valve 16 is provided by piston 2 which is anchored on valve stem 8 with a retaining nut 6 and washer 9 and sealed with O-ring 10.

Piston 2 is a relatively thin piston, its thickness being less than one-half its diameter. It is desirable that it be as thin as possible in order that the entire operator may be compact in its vertical height as shown. By attachment of the piston to the valve stem, it may be thin without danger of tipping or cooking, and consequent jamming in the casing cylinder 23 in which the piston slides. Piston 2 is provided with sealing rings 11.

The minimum thickness of the piston is determined primarily by the air pressure to be applied to it, and this pressure is in turn determined by the force necessary to compress the spring 7 and to close the valve 16. The piston must be thick enough to resist significant bending into a convex by this applied air pressure. In an actual case a piston of high-strength aluminum with a diameter of 5¾ inches and a thickness of 1½ inches overall satisfactorily withstood an applied air pressure as high as 200 p.s.i.g. In this particular case, a valve throw of 1½ inches was needed, and was provided by utilizing a casing with a total inside depth of 5¾ inches. This depth gave room enough for the above-stated piston, ¼ inch clearance above it at full spring extension, and ½ inch below it at full spring compression, plus about 2 inches of skirt below the piston at the latter position. Most of this skirt was used to bring the casing open end 24 down to the compressor surface 25. The total external height of this particular casing was just over 6 inches, which was several inches shorter and thereby more compact than available commercial pocket operator valves.

As a secondary result of the compact design provided by this invention, the shallow casing can be readily and inexpensively machined from a solid cylinder or a rough cast casing.

Air for biassing the valve and piston toward the closed position is supplied and released through tap 18 from line 31, and controlled by three-way valve 33 from air reservoir 32. Movement of the piston and valve into the open position is provided by spiral spring 7, which is interposed around the valve stem between the top surface 29 of the compressor pocket and the bottom of the piston 2. An annular slot in the piston provides for space for the spring when it is fully compressed, further minimizing the piston thickness.

The casing, 1 is held up against the underside of the ring 3 only by the combination of the air pressure within the chamber and the upward force of the spring 7. Whenever the air pressure is zeroed by operation of the three-way valve, only the force of the spring at its most extended position holds the casing up, and the casing is relatively loose and is able under the impulse of the U-shaped packing rings 11 to align itself centrally with the piston and valve stem.

While not necessary to the basic purpose of this invention, its use is in practice facilitated by the inclusion of an indicator to show positively whether the valve is open or closed. This indication may conveniently be provided by attachment of a rising indicator rod 4 to the top end of the piston, retained for instance, under the reduced diameter portion 6a of the valve stem nut 6. The indicator rod may pass through a packing gland 5 sealed with packing 12, and mounted in a suitable tap in the closed end 22 of the casing. It will be obvious that the exposed length of the rod is a visual indicator of the valve position.

OPERATION

While the operation of the pocket valve operator above described seems almost self-evident, it is probably best to insure a full disclosure of this invention by reviewing the operation briefly.

Let it be assumed that at the start of operations, no air pressure has been applied to the operator, and the compressor has been brought up to desired operating speed. For the direct-acting valve as illustrated in the Figure, the spring 7 will have raised the valve 16 off its seat 31, and the reciprocating motion of the compressor's piston will pump gas through the valve and to and from the clearance space contained within the compressor pocket 28. In order to add load to the compressor, and cause it actually to pump out this volume of compressed gas, the valve 16 off its seat 31, and the reciprocating motion of the compressor's piston will pump gas through the valve and to and from the clearance space contained within the compressor pocket 28. In order to add load to the compressor, and cause it actually to pump out this volume of compressed gas, the valve 16 must be seated on seat 31. To this end, three-way valve 33 is operated to connect air supply 32 (with a sufficient supply pressure, typically 200 p.s.i.g.) through air connection 31 to tap 18—with the flow of air into the cylinder of casing 1, the air pressure rises upon piston 2 until sufficient force is produced to compress spring 7 and drive stem 8 and valve 16 home onto seat 31. The chamber in pocket 28 being now disconnected from the compressor cylinder's internal clearance, the compressor "loads," and expels a volume of compressed gas as soon as its clearance volume pressure becomes sufficient to open the outlet valves.

In the ordinary application of this invention in natural gas pumping plants, each compressor cylinder, typically 3, 4 or 5, may have several, even up to four or five pocket operators. The airlines 31 for each operator will typically be brought from a control panel carrying the several three-way valves 33.

When signalled by an increase in discharge line pressure and/or a reduction in flowmeter reading, that the demand for gas has decreased, the human operator (or computer-controlled operator, as the case may be) switches off enough pocket valve operators to reestablish the line pressure at the new lowered demand; and conversely.

Since the time required for changing each pocket valve is only several seconds with the operator of this invention, as compared with an average of at least 30 seconds for each manual pocket valve, and since negligible labor is involved, it is practical at times of rapidly fluctuating demand to make many resettings. By thus keeping closely in step with demand, compressor operating costs are minimized.

Because of the compactness of the pneumatic operator of this invention, and its much lower cost than available commercial units, it both becomes possible and practical to have a pneumatic operator on every unloader pocket of each cylinder. Thereby the finest possible gradation of unloading is available, and the match with demand is further assured.

It has been found entirely practical to make the casing, the clamping ring and the piston all of high-strength aluminum alloy. Because of this material, the operator is much lighter in weight than available commercial operators, and being also small and compact, it is very easy for a maintenance man to lift the operator in or out of position after having removed the retaining bolts. Experience over several months has shown that downtime of a compressor for changing or checking pocket operators of this invention is hours shorter for each operator, and that no failures resulting in emergency shutdown of a compressor have occurred, both of these observations being in great contrast to experience with available commercial valves.

There are variations of the specific pneumatic operator hereinbefore described, that partake of the same inventive features, and to which this inventor is entitled. Examples of these variations are the following:

1. Reverse acting valve

The pneumatic operator of this invention is equally applicable to reverse acting valves; for example, those in which the valve 16 is below the seat 31, and is raised rather than lowered, in order to close the valve. In this case, the spring 7 biases the valve closed, and the application of pneumatic pressure to piston 2 overcomes the spring force and the compressor cylinder pressure and opens the valve.

2. Head-End Pockets and Inlet Valve Release

The description has described the pneumatic operator of this invention as it would be used in side pockets of a compressor. It will be obvious, however, that it is equally applicable to the control of head-end pockets (those in the outer end cover of the compressor) and to the holding open of suction valves, another common method of unloading a compressor.

3. Clamping means

The pneumatic operator of this invention has been described specifically using a clamping means comprising an encircling ring 3 bearing against the back of the casing flange 21, and bolted to the compressor surface with bolts 17. Rather than a complete ring, the clamping could have been provided with dogs more or less in the shape of segments of the ring, each dog having one hole through which a bolt 17 would pass.

I claim as my invention:

1. For use on a reciprocating-piston in cylinder gas compressor having an unloading pocket in an attached pocket body, the said body carrying also a valve on a valve stem movable axially between a closed position of the valve, and an open position of the valve, in which open position the pocket is connected for gas flow with the cylinder, the stem protruding from the said body, a pneumatic operator for said valve comprising in cooperative combination,
   1. a piston carried concentrically and rigidly on the protruding end of said valve stem, the piston having an axial thickness less than about one-half its diameter, whereby axial movement of the piston impels the valve stem between the closed position and the open position of the valve,
   2. a shallow casing forming a cylindrical chamber coaxially surrounding and interfitting with the said piston for pneumatic sealing but slidable engagement between the piston and the chamber, the casing having an open end proximal to said body and a closed end distal from said body, the open end being flared into a radially extending flange, the closed end having a pipe tap therein,
   3. clamping means comprising a circumferential ring attached to said body and surrounding said casing and bearing against its flange behind the open end and distal from said body sufficiently that during operation of said piston said casing is held only loosely with respect to said body, whereby said casing is free to align itself coaxially with said piston,
   4. a spiral spring surrounding said stem and interposed between said body and said piston whereby the piston is biased in an axial direction reducing the chamber volume between piston and closed end,
   5. a source of controllable pneumatic pressure connected to said pipe tap whereby the piston may be pneumatically biased in axial direction increasing the chamber volume,
   6. a vent from the space between said piston and said body whereby any pneumatic and gas compressor leaks are vented to safe disposal.